Jan. 15, 1929.  1,699,255
P. SIEDLER ET AL
APPARATUS FOR REFINING RAW CARBON DISULPHIDE
Original Filed Oct. 11, 1926
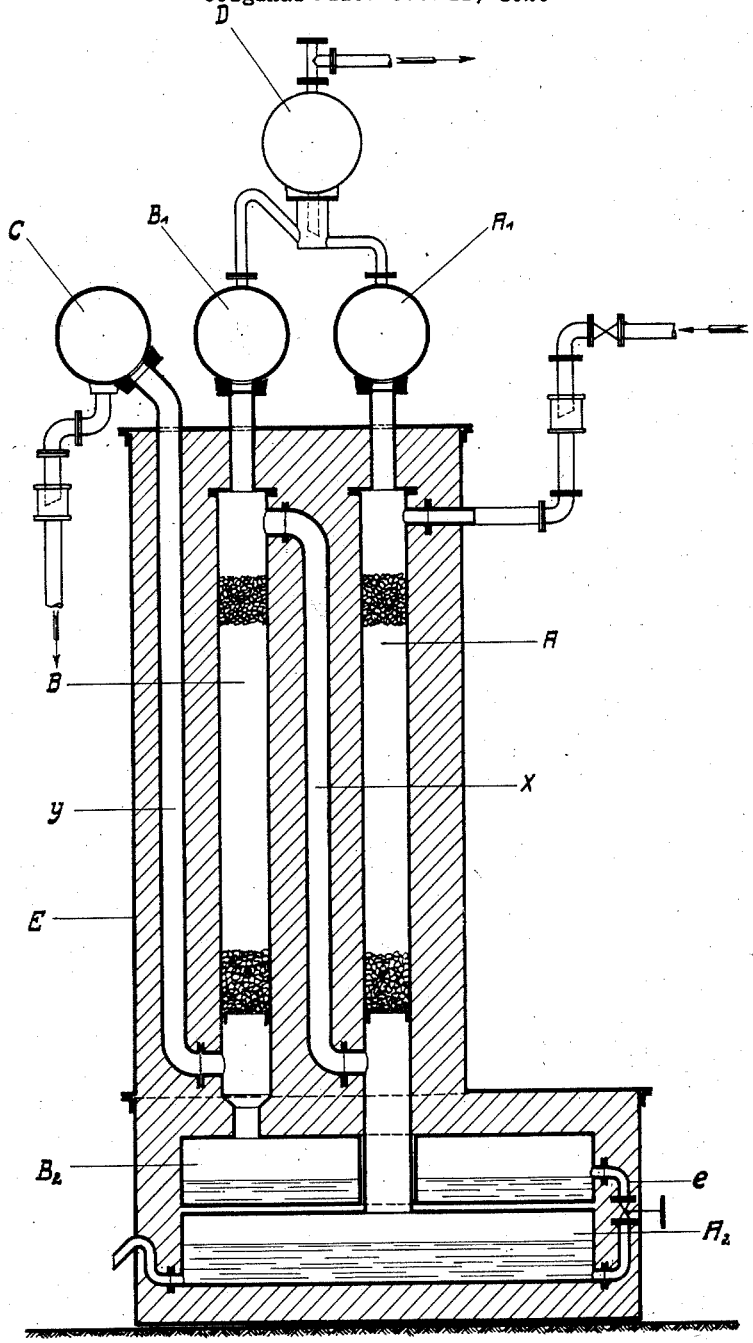
Inventors:
Philipp Siedler, Eugen Schulte
by
Paul Feichlund
Attorney Patented Jan. 15, 1929.

1,699,255

UNITED STATES PATENT OFFICE.

PHILIPP SIEDLER, OF GRIESHEIM-ON-THE-MAIN, AND EUGEN SCHULTE, OF SCHWAN-HEIM-ON-THE-MAIN, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY.

APPARATUS FOR REFINING RAW-CARBON DISULPHIDE.

Original application filed October 11, 1926, Serial No. 141,020, and in Germany October 24, 1925. Divided and this application filed November 5, 1927. Serial No. 231,377.

This invention relates to apparatus for refining the raw carbon disulphide obtained by the usual processes more especially by the process described in our copending application Ser. No. 141,020, filed October 11, 1926, from which this application has been divided out. Hitherto such refining was preferably effected either by chemical means or by fractional distillation from a still or the like apparatus, or by both means. Recently it has been attempted to accomplish a continuous treatment by means of rectifying-columns in combinatoin with other physical or chemical refining methods. Hereby one has, it is true, succeeded in removing the main quantity of sulphuretted hydrogen and other volatile contaminations, and, at the same time, recovering the sulphur copiously contained in the raw product and also the non-volatile sulphureous compounds which might be present; however this result could only be attained by withdrawing, from the still, a highly concentrated carbon disulphide solution of these substances, without accomplishing the separation up to the obtainment of molten sulphur, which could immediately be reused in the further production of carbon disulphide. This aim has, owing to the difficulty in reaching it, not yet been attained. This is, as we have recognized, due to the fact that carbon disulphide, even if not preserved under water, is generally saturated to a greater or less extent with water. At temperatures of about 100° C. or more required for obtaining molten sulphur, dissolved or molten sulphur already reacts to a certain extent with water, forming sulphuretted hydrogen, by which the carbon disulphide to be subjected to distillation is again permanently contaminated.

By our present invention we have succeeded in overcoming this difficulty. The invention provides a continuous process of the rectification type, wherein the rectification is carried out in a pair of similar columns provided with reflux condensers, the first column (A) being irrigated with crude carbon disulphide, whilst the second column (B) is irrigated with the partially purified carbon disulphide obtained from the first column. The distilling vessel or boiler $B_2$ of the second column (B), containing a diluted solution of sulphur in carbon disulphide, is maintained at a temperature slightly above the boiling point of pure carbon disulphide. This solution is withdrawn continuously or intermittently by transferring it into the distilling vessel or boiler $A_2$, in which liquid sulphur collects which is withdrawn from time to time. As the boiling-point of this solution approximates that of pure carbon disulphide, and at this temperature sulphur does not yet react with the traces of water always present, the carbon disulphide distilling off from B can no more be contaminated by sulphuretted hydrogen.

For carrying out this process it is further important that the carbon disulphide vapors distilling off from the columns are withdrawn in the proximity of the bottom ends of the columns and thence are again conveyed to the top for further treatment, i. e. from A to the top of B, and from B to an elevated device for condensing the pure final product. The connecting conduit-pipes form communicating vessels with the corresponding columns, in which vessels the carbon disulphide vapors must be approximately equilibrated if during the distillation fluctuations possibly detrimental to the rectifying action are to be prevented.

A further important requirement is that the gases escaping from the two reflux-condensers above the columns A and B, substantially consisting of sulphuretted hydrogen and other volatile sulphureous compounds, besides a little carbon disulphide, are jointly conveyed to a low-temperature condenser arranged above the reflux-condenser from which low-temperature condenser on the one hand, the remaining part of the carbon disulphide here condensed is conveyed to column A, and, on the other hand, the waste gases are conducted away for further use.

In its continuous course the rectification takes place in the manner hereafter described, reference being had to the single figure of the annexed drawing in which a refining plant for carrying out our present invention is diagrammatically illustrated. The column A is irrigated with carbon disulphide. The warm gases entering from below expel the sulphuretted hydrogen and other easily volatile parts to the reflux-condenser A, by which the main part of the carbon disulphide carried along with them is separated from the gases and flows back to A. The last parts of carbon disulphide contained in the sulphuretted hydrogen are separated in the elevated low-temperature condenser D, whence they are, combined with the carbon disulphide parts eventually arriving at D from B₁ conducted back to A for irrigating purposes. Carbon disulphide vapor nearly free from sulphuretted hydrogen and still containing small quantities of sulphur boils through pipe X to the top of B; the carbon disulphide solution enriched with sulphur runs further through A to the boiler A₂, in which a temperature above 120° C., i. e. above the melting-point of β-sulphur is maintained, so that continuously or intermittently liquid sulphur showing, on an average, a purity of about 98 p. ct. may be withdrawn from the still. The vapors entering at B from X are, for the most part, condensed by B₁; the remaining part of sulphuretted hydrogen passes to D through B₁. During its passage through B, the boiling-point of pure carbon disulphide is attained in the proximity of the lower end of the column; the quite pure carbon disulphide vapors are here conducted up to the condenser C through pipe Y. In this way a carbon disulphide solution the boiling-point of which surpasses that of the pure product only by a few degrees and containing a small percentage of sulphur arrives at the boiler B₂. This solution is continuously or intermittently used with others to feed A₂ through pipe e. Preferably the still B₂ is placed above A₂ and constructed to form an annular space around the bottom end of A.

For heating the boilers A₂ and B₂ any known device may be employed. Preferably the columns and boilers are surrounded by a jacket E to form a unity which may be insulated outwardly by a suitable poor conductor of heat.

With our improved apparatus we thus obtain continuously and in a merely physical way:—Purest carbon disulphide with practically quantitative output, sulphuretted hydrogen in combination with other volatile by-products in a highly concentrated form; sulphur together with non-volatile contaminations in the form of a molten mass which may be immediately reused for the production of carbon disulphide.

We claim:—

1. An apparatus for refining raw carbon disulphide, comprising two similar columns provided with reflux-condensers and respective boilers, a device for condensing the purified carbon disulphide arranged at the level of the reflux-condensers, and a low-temperature condenser arranged above the reflux-condensers.

2. An apparatus for refining raw carbon disulphide, comprising two similar columns, provided with reflux-condensers and respective boilers, of which the second surrounds the bottom end of the first column, a device for condensing the purified carbon disulphide arranged at the level of the reflux-condensers, and a low-temperature condenser arranged above the reflux-condensers.

In testimony whereof we affix our signatures.

PHILIPP SIEDLER.
EUGEN SCHULTE.